(12) United States Patent
Hirano

(10) Patent No.: US 10,831,078 B2
(45) Date of Patent: Nov. 10, 2020

(54) ELECTROCHEMICAL OPTICAL DEVICE

(71) Applicant: Stanley Electric Co., Ltd., Tokyo (JP)

(72) Inventor: Tomoya Hirano, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 205 days.

(21) Appl. No.: 16/144,801

(22) Filed: Sep. 27, 2018

(65) Prior Publication Data

US 2019/0101805 A1 Apr. 4, 2019

(30) Foreign Application Priority Data

Sep. 29, 2017 (JP) ................................. 2017-190605

(51) Int. Cl.
| | | |
|---|---|---|
| G02F 1/155 | (2006.01) | |
| F21K 2/08 | (2006.01) | |
| G02F 1/1523 | (2019.01) | |

(52) U.S. Cl.
CPC ................ *G02F 1/155* (2013.01); *F21K 2/08* (2013.01); *G02F 1/1523* (2013.01)

(58) Field of Classification Search
CPC .......... G02F 1/155; G02F 1/153; G02F 1/163; G02F 1/15; G02F 1/157
USPC ........................................................ 359/266
See application file for complete search history.

(56) References Cited

U.S. PATENT DOCUMENTS

| 8,373,359 | B2 * | 2/2013 | Kizaki | ................... | C09K 11/06 |
| | | | | | 313/358 |
| 8,810,557 | B2 * | 8/2014 | Kizaki | ................... | C09K 11/06 |
| | | | | | 345/211 |
| 9,935,270 | B2 * | 4/2018 | Yonekawa | ................ | F21K 2/08 |
| 2004/0066637 | A1 * | 4/2004 | Imai | .................. | G02F 1/136204 |
| | | | | | 361/777 |
| 2009/0243502 | A1 * | 10/2009 | Kizaki | ................... | C09K 11/06 |
| | | | | | 315/246 |

FOREIGN PATENT DOCUMENTS

| JP | 2005-521103 A | 7/2005 |
| JP | 2009-230073 A | 10/2009 |
| WO | 03/081330 A1 | 10/2003 |

* cited by examiner

*Primary Examiner* — Mohammed A Hasan
(74) *Attorney, Agent, or Firm* — Kenealy Vaidya LLP

(57) ABSTRACT

A high-quality electrochemical optical device includes: first and second substrates having electrodes so that the electrodes of the second substrates are arranged to correspondingly face the electrodes of the first substrate; reaction/ion conduction layers each disposed between one electrode of the first substrate and a corresponding one electrode of the second substrate; and conduction materials disposed between the first and second substrates and between the reaction/ion conduction layers. Electrochemical optical element regions are defined in a tiling fashion at respective positions of the reaction/ion conduction layers to correspondingly include the electrodes of the first and second substrates, and the reaction/ion conduction layer. The conduction materials electrically connect the electrochemical optical element regions in series in the same direction by connecting the electrode of the first substrate in one of the mutually adjacent electrochemical optical element regions and the electrode of the second substrate in the other electrochemical optical element region.

20 Claims, 12 Drawing Sheets

FIG. 4

|  |  | Length of Electrolyte Layer in X axis Direction | | | | | |
|---|---|---|---|---|---|---|---|
|  |  | 10 mm | 17.67784 mm | 56.6 mm | 63 mm | 81 mm | 190 mm |
| Thickness of Electrolyte Layer | 30 μm | 0.1 > | 0.147 | 18.2 | --- | --- | 80 |
|  | 50 μm | 0.1 > | 0.1 > | 1.737 | --- | --- | 80 |
|  | 70 μm | 0.1 > | 0.1 > | 0.253 | 1.2 | --- | 80 |
|  | 100 μm | 0.1 > | 0.1 > | 0.1 > | 0.1 > | 2.12 | 80 |

Light transmittance [%] when voltage is applied while irradiated with light of 650 nm.

* "0.1>" means the light transmittance is less than the measurement limit of the measuring device (while there is no light leakage).

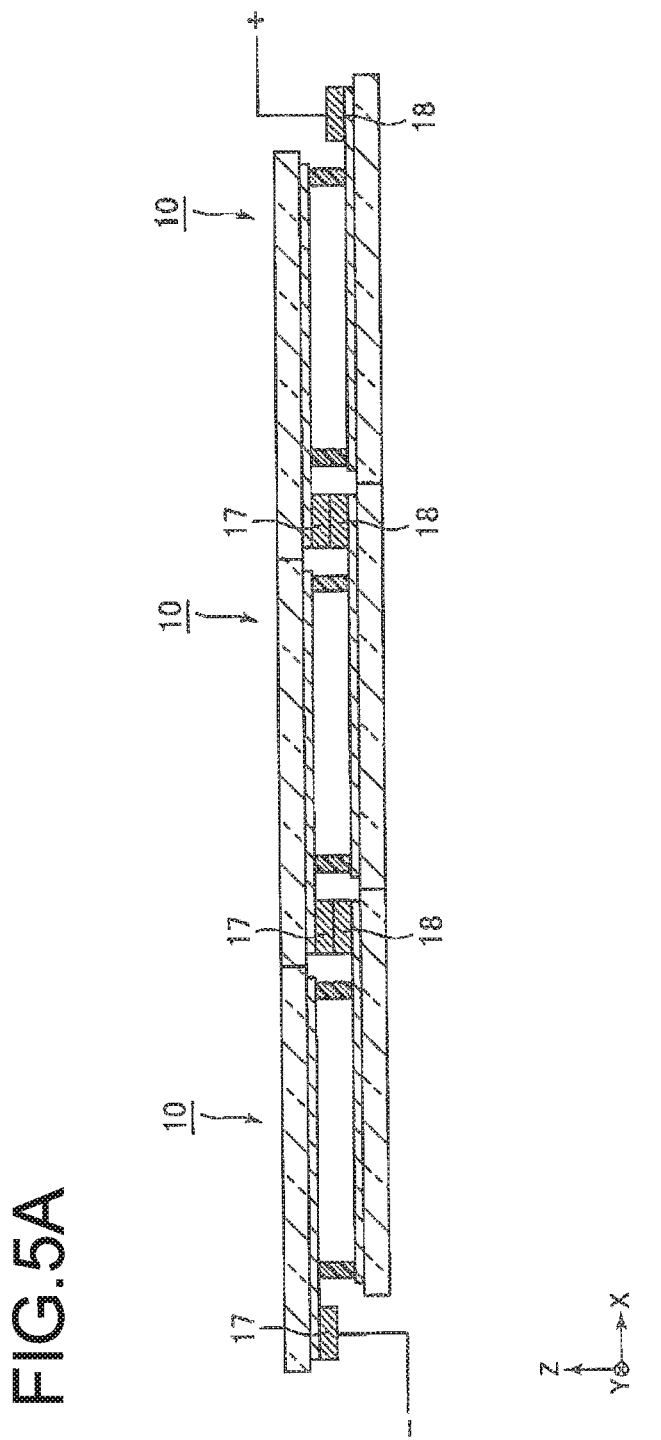

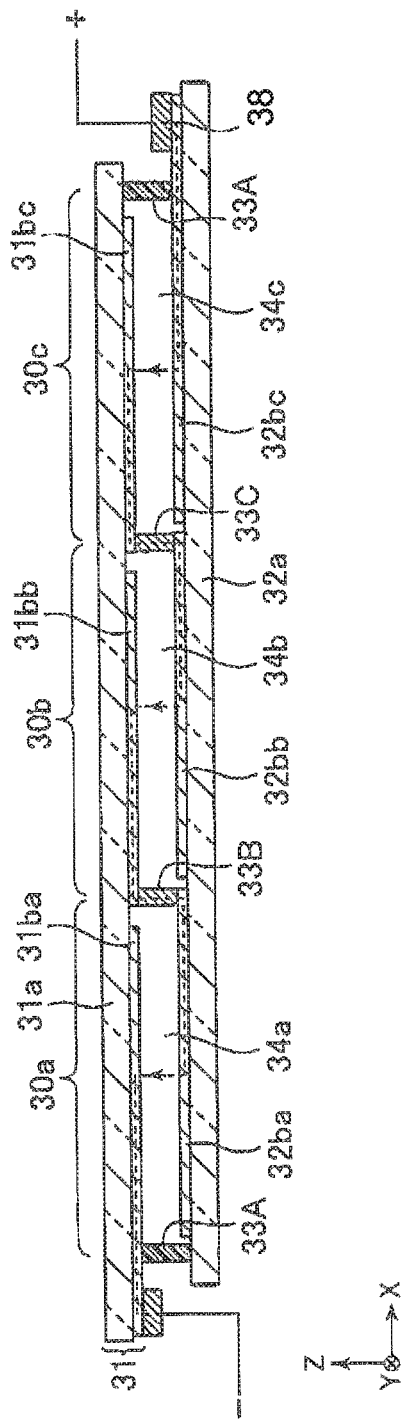

ELECTROCHEMICAL OPTICAL DEVICE

This application claims the priority benefit under 35 U.S.C. § 119 of Japanese Patent Application No. 2017-190605 filed on Sep. 29, 2017, which is hereby incorporated in its entirety by reference.

TECHNICAL FIELD

The presently disclosed subject matter relates to an electrochemical optical device including a plurality of electrochemical optical element regions.

BACKGROUND ART

An electrochemical optical element refers to an element which has a structure in which a reaction layer and an ion conducting layer (both of which can be formed of a common layer) are interposed between a pair of electrodes, and which is capable of causing an oxidation-reduction reaction between the electrodes and the reaction layer by applying a voltage between the electrodes, thereby changing optical characteristics. Examples of such an electrochemical optical element may include an electrochromic (EC) element and an electrochemiluminescence (ECL) element. Examples of the electrochromic elements may include an electrodeposition (ED) element.

In an electrochromic element which performs large area display, display unevenness due to a bias in current density is likely to occur. In addition, the response speed is decreased. For this reason, tiling may be used.

FIG. 7 is a schematic cross-sectional view illustrating an electrochromic display device 50 using tiling. (See, for example, Japanese Translation of PCT Patent Application Publication No. 2005-521103, which corresponds to WO2003/081330.)

The electrochromic display device 50 includes an upper substrate 51 and a lower substrate 52 disposed to face to each other, a conductive thin film 53 disposed on the upper substrate 51, a working electrode 54 and a counter electrode 55 disposed spaced apart from each other on the lower substrate 52, and an electrolyte layer 56 disposed between the substrates 51 and 52. A DC power supply 57 is connected between the operating electrode 54 and the opposite electrode 55. The electrolyte layer 56 contains an electrochromic material. When a voltage is applied between the electrodes 54 and 55 by the DC power supply 57, a current path can be formed in the direction of an arrow shown in the drawing, for example, to flow a current. Then, either an oxidation reaction or a reduction reaction occurs at the boundary between the conductive thin film 53 and the electrolyte layer 56 in the region immediately above the working electrode 54. The other of the oxidation reaction and the reduction reaction occurs at the boundary between the conductive thin film 53 and the electrolyte layer 56 in the region immediately above the opposite electrode 55. In the electrochromic display device 50, an appearance change due to the electrochromic material occurs only in the arrangement region of the working electrode 54 and the opposite electrode 55.

However, when this configuration is employed in the electrodeposition element and a tiling driving method (a method of driving the tiled plurality of regions in the electrochromic display device 50 while connecting the electrodes on the same side to one another to drive them serving as a single display device) is performed, display unevenness may occur. For example, in the case of an electrodeposition element including an electrolyte layer containing silver ions and used as a mirror device, the deposition surface of silver at the time of voltage application differs between the position of the working electrode 54 and the position of the opposite electrode 55. That is, silver is deposited on the lower substrate 52 side at the position of the operating electrode 54, and silver is deposited on the upper substrate 51 side at the position of the opposite electrode 55. Since the deposition surfaces of silver are not located on a certain one side of the substrates, the reflectance and the color tone are different depending on the positions of the electrodes 54 and 55, and the display quality is thus deteriorated.

Thus, in the conventional technique, even when tiling is used to improve display unevenness or slow response speed which has been due to, for example, bias in current density, it has been difficult to realize a high-quality electrochemical optical device in some cases.

It is to be noted that an invention of an electrochemical light-emitting display device having low luminance unevenness and high reliability and the like is also known. (See, for example, Japanese Patent Application Laid-Open No. 2009-230073, which corresponds to US2009/0243502A1).

SUMMARY

The presently disclosed subject matter was devised in view of these and other problems and features in association with the conventional art. According to an aspect of the presently disclosed subject matter, a high-quality electrochemical optical device can be provided.

According to another aspect of the presently disclosed subject matter, an electrochemical optical device can include: a first substrate having a first principal surface and a plurality of first electrodes electrically separated from one another, the plurality of first electrodes being disposed on the first principal surface; a second substrate having a second principal surface and a plurality of second electrodes electrically separated from one another, the plurality of second electrodes being disposed on the second principal surface, the second substrate being arranged to face to the first substrate in a substantially parallel manner, so that each of the plurality of second electrodes is arranged to face to each of the plurality of first electrodes disposed on the first principal surface of the first substrate; a plurality of reaction/ion conduction layers each disposed between one of the plurality of first electrodes of the first substrate and a corresponding one of the plurality of second electrodes of the second substrate arranged to face to the one of the plurality of first electrodes of the first substrate; and a plurality of conduction materials disposed between the first principal surface of the first substrate and the second principal surface of the second substrate and disposed between the plurality of reaction/ion conduction layers, the plurality of conduction materials being configured to electrically connect in series a plurality of electrochemical optical element regions in a certain same direction, the plurality of electrochemical optical element regions corresponding to respective positions of the plurality of reaction/ion conduction layers and defined to include the first electrode of the first substrate, the second electrode of the second substrate, and the reaction/ion conduction layer, the conduction material electrically connecting the first electrode of the first substrate in one of the electrochemical optical element regions and the second electrode of the second substrate in the electrochemical optical element region adjacent to the one electrochemical optical element region, wherein the plurality of electrochemical optical element regions are arranged to fill in a tiling fashion.

In the electrochemical optical device with the above-described configuration, the plurality of electrochemical optical element regions may be arranged in one direction, each of the reaction/ion conduction layers of the plurality of electrochemical optical element regions may have a thickness of 1 μm or more and 500 μm or less, and each of the reaction/ion conduction layers of the plurality of electrochemical optical element regions may have a length in the one direction of 10 mm or less when the thickness of the reaction/ion conduction layer is 1 μm or more and less than 30 μm, of 20 mm or less when the thickness of the reaction/ion conduction layer is 30 μm or more and less than 50 μm, of 30 μmm or less when the thickness of the reaction/ion conduction layer is 50 μm or more and less than 70 μm, of 56.6 mm or less when the thickness of the reaction/ion conduction layer is 70 μm or more and less than 100 μm, or of 63 mm or less when the thickness of the reaction/ion conduction layer is 100 μm or more and 500 μm or less.

In the electrochemical optical device with the above-described configuration, the plurality of electrochemical optical element regions may be arranged in one direction, and a conductor having substantially the same potential at an arrangement position in a range covering an arrangement range of the reaction/ion conduction layer in a direction orthogonal to the one direction in which the plurality of electrochemical optical element regions may be arranged.

In the electrochemical optical device with the above-described configuration, the plurality of electrochemical optical element regions may be arranged in one direction and each composed of a single electrochemical optical element, in the single electrochemical optical element, the first and second substrates may include respective protruding portions that protrude in mutually opposite directions along the one direction from respective regions where the first and second substrates overlap each other in plan view, and mutually adjacent ones of the electrochemical optical elements may be connected to each other so that the protruding portions face to each other.

In the electrochemical optical device with the above-described configuration, the conduction material may be a conductive connecting material having any of a compression property and a flowable property.

In the electrochemical optical device with the above-described configuration, the conductive connecting material may be any of a conductive tape and a conductive adhesive.

In the electrochemical optical device with the above-described configuration, the conduction material may be a part of a seal material configured to seal the reaction/ion conduction layer.

According to the presently disclosed subject matter, a high-quality electrochemical optical device can be provided.

BRIEF DESCRIPTION OF DRAWINGS

These and other characteristics, features, and advantages of the presently disclosed subject matter will become clear from the following description with reference to the accompanying drawings, wherein:

FIG. 4 shows a table indicating light transmittances during voltage application.

FIG. 5A is a schematic cross-sectional view illustrating an electrodeposition device according to the first exemplary embodiment.

FIG. 7C is a schematic cross-sectional view illustrating current paths in the electrodeposition device according to the second exemplary embodiment.

DESCRIPTION OF EXEMPLARY EMBODIMENTS

Figure 1:
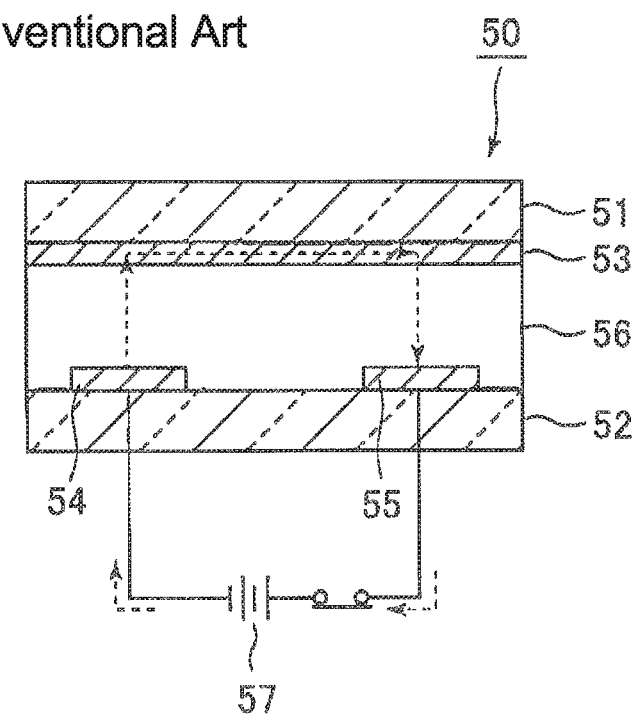
FIG. 1 is a schematic cross-sectional view illustrating an electrochromic display device 50 using tiling.

A description will now be made below to electrochemical optical elements and devices of the presently disclosed subject matter with reference to the accompanying drawings in accordance with exemplary embodiments. The coordinate system can be defined by an orthogonal coordinate system including an X(axis) direction, a Y(axis) direction, and a Z(axis) direction as illustrated in the drawings.

Figure 2:
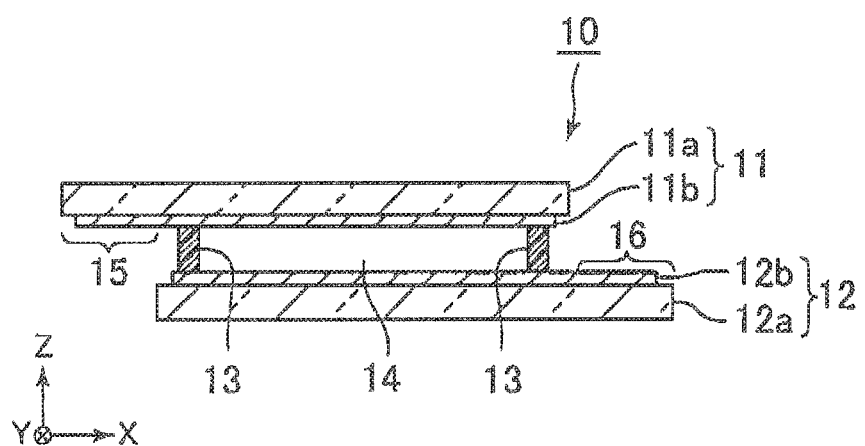
FIG. 2 is a schematic cross-sectional view illustrating an electrochemical optical element for use in an electrochemical optical device according to a first exemplary embodiment, made in accordance with principles of the presently disclosed subject matter.

FIG. 2 is a schematic cross-sectional view illustrating an electrochemical optical element for use in an electrochemical optical device according to a first exemplary embodiment. The electrochemical optical device according to the first exemplary embodiment may be an electrodeposition device using an electrodeposition element 10.

The electrodeposition element 10 may be configured to include an upper substrate 11 and a lower substrate 12 which are disposed to face to each other in a substantially parallel manner, and an electrolyte layer (corresponding to a reaction/ion conduction layer) 14 disposed between the substrates 11 and 12.

The upper substrate 11 and the lower substrate 12 can include an upper transparent substrate 11a and a lower transparent substrate 12a, and an upper transparent electrode 11b and a lower transparent electrode 12b formed on the respective transparent substrates 11a and 12a, respectively. The transparent electrodes 11b and 12b are each an electrode having a smooth surface, and may have a rectangular planar shape in which two adjacent sides extend in the X-axis direction and the Y-axis direction. The upper transparent substrate 11a and the lower transparent substrate 12a may each be a glass substrate having a thickness of 0.7 mm, for example, and the upper transparent electrode 11b and the lower transparent electrode 12b may each be formed of an ITO (indium tin oxide) having a thickness of 300 nm, for example.

Between the upper substrate 11 and the lower substrate 12, seal portions 13 can be provided to define and seal a certain inner region thereinside. The electrolyte layer 14 can be arranged in the inner region defined by the seal portions 13 between the upper substrate 11 and the lower substrate 12 and may include an electrodeposition material (e.g., AgBr) containing silver (silver ions). The thickness of the electrolyte layer 14 may be, for example, 1 μm to 500 μm, and is 100 μm in this example. The seal portion 13 may be formed using a material such as a resin, for example.

In the electrodeposition element 10, the arrangement positions of the electrodes 11b and 12b do not coincide with each other when viewed in plan view (when viewed from the normal direction (Z-axis direction) of the substrates 11 and 12). The electrodes 11b and 12b are arranged so as to be mutually offset in the in-plane direction of the substrates 11 and 12. The substrates 11 and 12 are provided with protruding portions 15 and 16 respectively that protrude in mutually opposite directions (in a negative X-axis direction and in a positive X-axis direction) from respective regions where the substrates 11 and 12 overlap each other when viewed in plan view. The electrodes 11b and 12b can extend to also be disposed on the protruding portions 15 and 16, and protrude in mutually opposite directions (in the negative X-axis direction and in the positive X-axis direction).

The electrodeposition element 10 may have a rectangular shape when viewed in plan view, for example, having a length of 67 mm in the X-axis direction and a length of 250 mm in the Y-axis direction. The region where the substrates 11 and 12 overlap each other in plan view may be a rectangular shape, for example, having a length of 61 mm in the X-axis direction and a length of 250 mm in the Y-axis direction. The planar shape of the electrolyte layer 14 may be a rectangular shape of a size approximate to the rectangular shape of the region as above. The proturding portions 15 and 16 may have a rectangular shape having a length of 3 mm in the X-axis direction and a length of 250 mm in the Y-axis direction.

The electrodeposition element 10 can be used as a mirror device capable of electrically switching between a transparent state and a mirror state (reflection state) by a DC voltage applied between the electrodes 11b and 12b, for example.

When no voltage is applied, the electrodeposition element 10 is in a transparent state. Light incident on the electrodeposition element 10 can be transmitted therethrough.

When a voltage is applied between the electrodes 11b and 12b, the electrodeposition element 10 can be brought into a mirror state. As an example, when the lower transparent electrode 12b is grounded and a DC voltage of −2.5 V is applied to the upper transparent electrode 11b, the silver ions contained in the electrolyte layer 14 are reduced to become metal silver near the upper transparent electrode 11b (the electrode that becomes the negative voltage side), and precipitation and stacking of silver can form a silver film on the electrode 11b. The silver film acts as a mirror surface to reflect light incident on the electrodeposition element 10.

The silver film disappears from the upper transparent electrode 11b by turning off the voltage (0 V or an open state) or applying a reverse bias (e.g., +1 V). The application of reverse bias is easier to make silver quickly disappear to bring the electrodeposition element 10 into a transparent state.

The electrodeposition element 10 can be used as a mirror device that realizes a transparent state and a mirror state interchangeably by, for example, changing between a no-application state and an application state of a DC voltage.

The electrodeposition element 10 can be produced, for example, by the following manner.

A pair of transparent electrodes (electrodes 11b and 12b) and patterned glass substrates (substrates 11a and 12a) are prepared. As the transparent electrode on the glass substrate, a smooth transparent conductive film, for example, an ITO film may be used. The transparent conductive film can be formed by sputtering, CVD, evaporation, or the like.

The pair of glass substrates (substrates 11a and 12a) is arranged so that the ITO films (electrodes 11b and 12b) face each other to form a cell.

The gap control agent is sprayed on one of the pair of substrates 11 and 12. By selecting the diameter of the gap control agent, the thickness (cell gap) of the electrolyte layer 14 can be set, for example, in the range of 1 μm to 500 μm.

On the other of the pair of substrates 11 and 12, a main seal pattern (a rectangular seal pattern which is partially lacked) is formed using a seal material. For example, an ultraviolet curable sealing material may be used. The application of the gap control agent and the formation of the main seal pattern may be performed on the same substrate side.

The paired substrates 11 and 12 are stacked to form an empty cell.

Next, an electrolytic solution containing an electrodeposition material is sealed between the pair of substrates 11 and 12 to form an electrolyte layer 14.

Specifically, for example, an electrolytic solution containing an electrodeposition material is injected into the empty cell by a vacuum injection method, and then the injection port is sealed, and the sealing material is irradiated with ultraviolet rays to cure the sealing material, thereby forming the sealing portions 13 and the electrolyte layer 14 in the internal region thereof.

The electrolytic solution containing the electrodeposition material may be composed of an electrodeposition material (AgBr or the like), a mediator ($TaCl_5$ or the like), a supporting electrolyte (LiBr or the like), a solvent (γ-butyrolactone or the like), and the like. For example, 200 mM of AgBr as an electrodeposition material, 800 mM of LiBr as a supporting electrolyte, and 30 mM of $TaCl_5$ as a mediator are added to γ-butyrolactone as a solvent to form an electrolytic solution.

Examples of the electrodeposition material to be used may include silver-containing materials such as AgBr, $AgNO_3$, and $AgClO_4$.

Examples of the mediator to be used may include Ta-containing mediators such as $TaBr_5$ and $TaI_5$ as well as $TaCl_5$, Ge-containing mediators such as $GeCl_4$, $GeBr_4$, and $GeI_4$, and Cu-containing mediators such as $CuCl_2$, $CuSO_4$, and $CuBr_2$.

The supporting electrolyte is not limited as long as it promotes oxidation-reduction reactions and the like of electrodeposition materials. Examples of the supporting electrolyte to be suitably used may include lithium salts such as LiCl, LiBr, LiI, $LiBF_4$, and $LiClO_4$, potassium salts such as KCl, KBr, and KI, and sodium salts such as NaCl, NaBr, and NaI. The concentration of the supporting electrolyte is preferably 10 mM or more and 1 M or less, for example, although it is not particularly limited.

The solvent is not limited as long as it can stably retain an electrodeposition material or the like. Examples of the solvent to be used may include a polar solvent such as water and propylene carbonate, an organic solvent having no polarity, an ionic liquid, an ionically conductive polymer, and a polymer electrolyte. Specific examples thereof to be suitably used may include, in addition to γ-butyrolactone, dimethyl sulfoxide (DMSO), propylene carbonate, N,N-dimethylformamide, tetrahydrofuran, acetonitrile, polyvinyl sulfate, polystyrene sulfonic acid, and polyacrylic acid.

In this manner, the electrodeposition element 10 can be manufactured.

Next, a further description of the configuration thereof will be given with reference to FIGS. 3A and 3B. In the production of the electrodeposition device according to the first exemplary embodiment, conductive double-sided tapes 17 and 18, which are compressible conductive connecting materials, are disposed on the electrodes 11b and 12b on the protruding portions 15 and 16 of the electrodeposition element 10. The conductive double-sided tapes 17 and 18 can be arranged so as to extend over the length of the arrangement range of the electrolyte layer 14 along the Y-axis direction, i.e., in a range greater than or equal to the arrangement range of the electrolyte layer 14 in the Y-axis direction. As the conductive double-sided tapes 17 and 18, for example, a conductive copper foil double-sided tape (sheet resistance value: 0.02 Ω/square) manufactured by Teraoka Seisakusho Co., Ltd. Another example may include a conductive aluminum foil double-sided tape (sheet resistance 0.5 Ω/square) manufactured by Teraoka Seisakusho Co., Ltd.

While the sheet resistance values of the ITO electrodes 11b and 12b are, for example, about 5 Ω/square, the sheet resistance values of the conductive double-sided tapes 17 and 18 are as small as 0.02 Ω/square. For this reason, it can be considered that the potentials at the positions where the conductive double-sided tapes 17 and 18 are arranged are equal to each other. Therefore, when a DC voltage is applied between the electrodes 11b and 12b (between the conductive double-sided tapes 17 and 18) in the electrodeposition configuration shown in FIGS. 3A and 3B, a silver film is formed so as to simultaneously occupy the area of the electrolyte layer 14 from the X-axis positive direction side and the X-axis negative direction side (see the arrow in FIG. 3B).

Here, when the length of the electrolyte layer 14 along the X-axis direction is too long, the silver film is less likely to be formed in the vicinity of the center of the electrolyte layer 14 along the X-axis direction. The light transmittance (leakage light rate) of the electrodeposition element structure may thus increase when a voltage is applied.

The inventor has carried out intensive research to investigate conditions under which the light transmission (leakage light rate) at the time of voltage application is low and a high-quality electrodeposition device is achieved.

FIG. 4 shows results from experiments performed by the inventor, i.e., the light transmittance at the time of voltage application. In this table, the light transmittance at the time of voltage application is expressed as "%" with respect to the light transmittance of air (light transmittance at the time of not arranging the electrodeposition structure) as one (1). The experiment was performed using the device with the configuration shown in FIGS. 3A and 3B while the length of the electrolyte layer 14 in the X-axis direction (the length of the upper and lower transparent electrodes 11b and 12b in the X-axis direction) and the thickness of the electrolyte layer 14 were varied, and the device was irradiated with light having a wavelength of 650 nm.

The reason why light having a wavelength of 650 nm is used is as follows. That is, the light shielding rate of the electrodeposition element (mirror device) is higher as the wavelength of light becomes shorter, and if the electrodeposition element can sufficiently shield light at a wavelength of 650 nm, light in the entire visible light region can be considered as being sufficiently shielded, and no light leakage is visually observed.

It can be understood that, regardless of the thickness of the electrolyte layer, as the length of the electrolyte layer in the X-axis direction increases, the light transmittance (leakage light rate) at the time of voltage application increases. Note that for all the electrolyte layer thicknesses in the table, when the length of the electrolyte layer in the X-axis direction is 190 mm, the light transmittance is 80%, and this is because the light transmittance of the electrodeposition structure at the time of no voltage application is 80%. This means that the upper limit of the light transmittance in the experiment is 80%.

In addition, it can be understood that as the thickness of the electrolyte layer increases, the light transmittance (leakage light rate) at the time of voltage application decreases.

In the electrodeposition device, high quality can be maintained if the light transmittance at the time of voltage application is, for example, about 1% or less.

Since the thickness of the electrolyte layer of the electrodeposition device according to the example is, for example, 1 μm to 500 μm, the inventor of the present application carried out the case divisions in consideration of this point, and derived the following conclusion with respect to the light transmittance at the time of voltage application from the table shown in FIG. 4 and the findings obtained by the study.

(i) When the thickness of the electrolyte layer is 1 μm or more and less than 30 μm, if the length of the electrolyte layer in the X-axis direction is 10 mm or less, it would be possible to make the quality of the electrodeposition device high.

(ii) When the thickness of the electrolyte layer is 30 μm or more and less than 50 μm, if the length of the electrolyte layer in the X-axis direction is 20 mm or less, it would be possible to make the quality of the electrodeposition device high.

(iii) When the thickness of the electrolyte layer is 50 μm or more and less than 70 μm, if the length of the electrolyte layer in the X-axis direction is 30 mm or less, it would be possible to make the quality of the electrodeposition device high.

(iv) When the thickness of the electrolyte layer is 70 μm or more and less than 100 μm, if the length of the electrolyte layer in the X-axis direction is 56.6 mm or less, it would be possible to make the quality of the electrodeposition device high.

(v) When the thickness of the electrolyte layer is 100 μm or more and 500 μm or less, if the length of the electrolyte layer in the X-axis direction is 63 mm or less, it would be possible to make the quality of the electrodeposition device high.

Figure 5B:
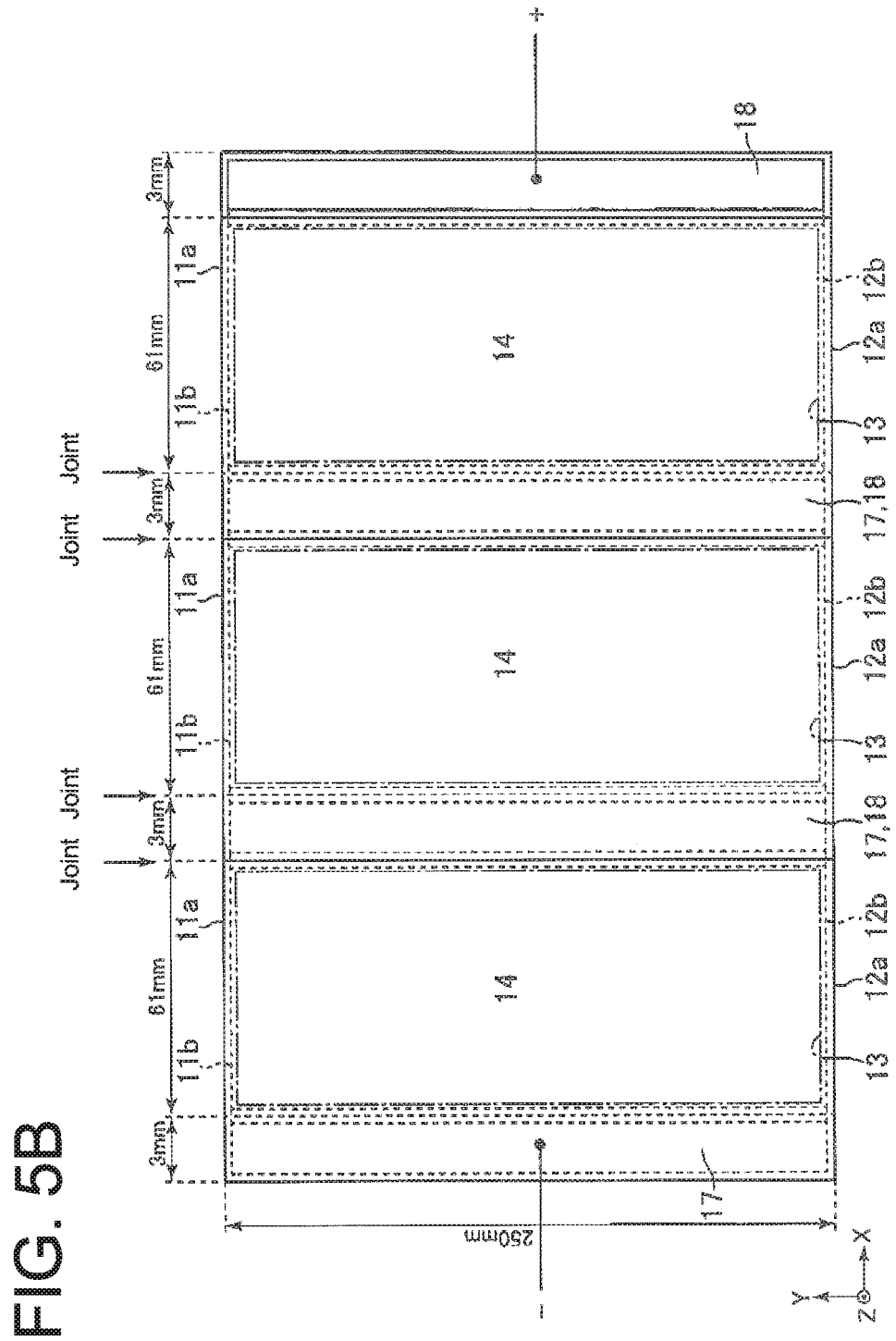
FIG. 5B is a schematic plan view illustrating the electrodeposition device according to the first exemplary embodiment.

FIG. 5A is a schematic cross-sectional view illustrating the electrodeposition device according to the first exemplary embodiment, and FIG. 5B is a schematic plan view thereof.

Figure 3A:
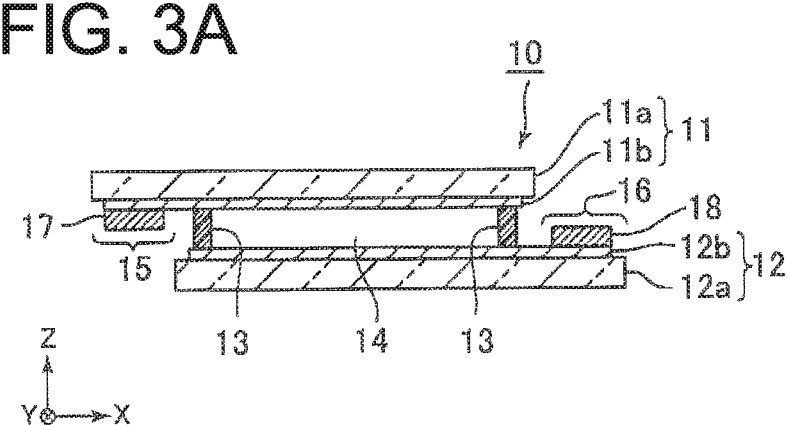
FIG. 3A and FIG. 3B are a cross-sectional view and a plan view illustrating a configuration of an electrodeposition element, respectively, wherein conductive double-sided tapes 17 and 18 are disposed on electrodes 11b and 12b on protruding portions 15 and 16 of an electrodeposition element 10, respectively.
Figure 3B:
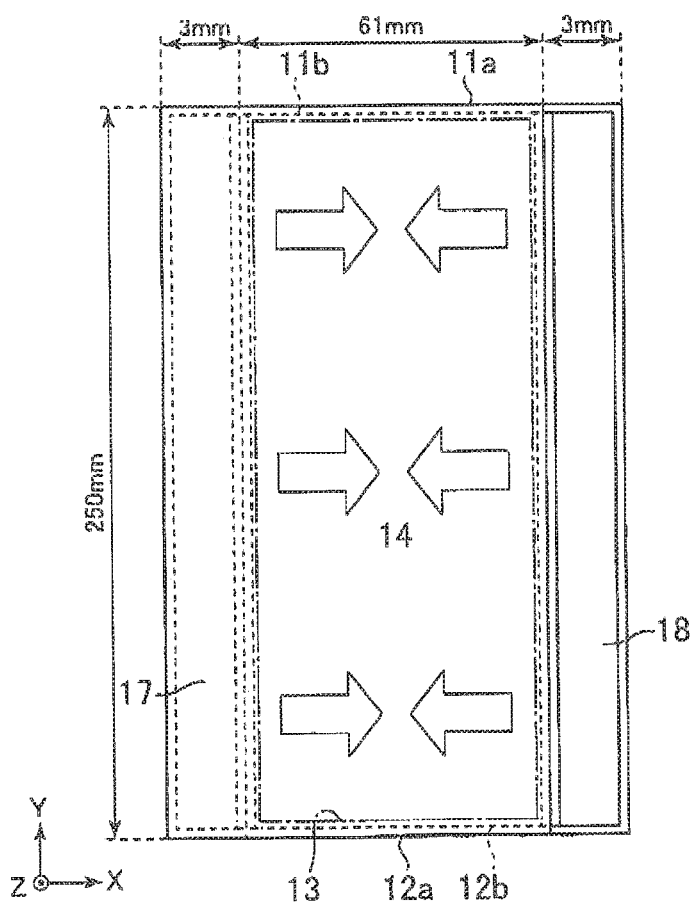

The electrodeposition device shown in both the drawings is an electrodeposition device in which three electrodeposition configurations shown in FIGS. 3A and 3B are connected and arranged along the X-axis direction (a direction parallel to the protruding direction of the protruding portions 15 and 16).

In the production of the electrodeposition device according to the first exemplary embodiment, three electrodeposition configurations shown in FIGS. 3A and 3B (three electrodeposition elements 10 having conductive double-sided tapes 17 and 18 having been disposed thereon) are prepared, and the three electrodeposition elements 10 are connected to each other such that the conductive double-sided tape 17 of one electrodeposition element 10 and the conductive double-sided tape 18 of another electrodeposition element 10 are bonded to each other.

In the electrodeposition device according to the first exemplary embodiment, the mutually adjacent electrodeposition elements 10 are superposed on each other at the protruding portions 15 and 16 when viewed in plan view, and are arranged along the X-axis direction. Then, the protruding portions 15 and 16 are connected in an opposed manner such that the upper transparent electrode 11$b$ of one of the adjacent electrodeposition elements 10 and the lower transparent electrode 12$b$ of the other electrodeposition element 10 are electrically connected via the conductive double-sided tapes 17 and 18. As a result, three electrodeposition elements 10 are electrically connected in series in the same direction. Note that the three electrodeposition elements 10 are arranged in close contact with each other in the XY plane direction when viewed in plan view, and fill the arrangement area without a gap. As will be described later, in the electrodeposition device according to the first exemplary embodiment, the difference in level (the amount of deviation along the normal line direction of the substrates 11 and 12) in the joint between the electrodeposition element regions (the electrodeposition elements 10 in the first exemplary embodiment) (at the connection position of the electrodeposition element region) is small.

In the electrodeposition device according to the first exemplary embodiment, the three electrodeposition elements 10 are connected in series in the same direction by using the upper and lower conduction materials (i.e., the conductive double-sided tapes 17 and 18) and tiled (the three electrodeposition elements 10 fill the area in the XY plane direction without a gap). However, the presently disclosed subject matter is not limited to this, and a larger number of electrodeposition elements 10 are connected in series in the same direction and tiled, so that a large-sized electrodeposition device can be produced.

The electrodeposition device according to the first exemplary embodiment is configured such that, for example, a DC power source is electrically connected between the lower transparent electrode 12$b$ (the conductive double-sided tape 18) of the electrodeposition element 10 disposed at one end portion on the X-axis positive direction side and the upper transparent electrode 11$b$ (the conductive double-sided tape 17) of the electrodeposition element 10 disposed at another end portion on the X-axis negative direction side, and a driving voltage is applied therebetween to drive the electrodeposition device.

Figure 5C:
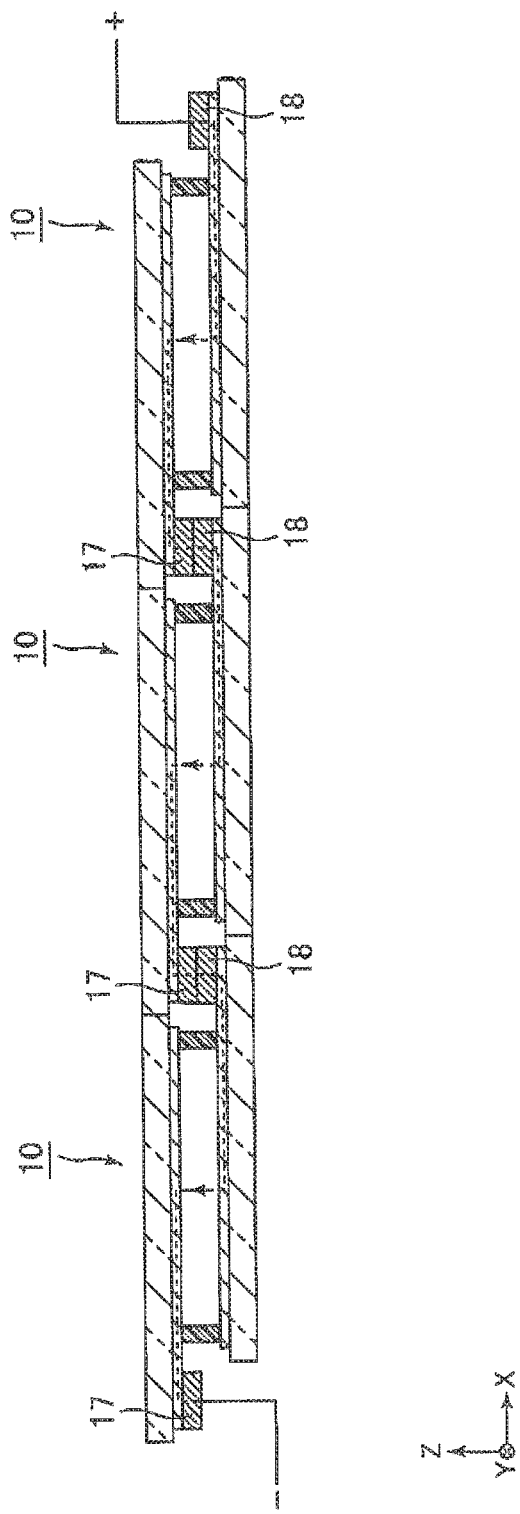
FIG. 5C is a schematic cross-sectional view illustrating current paths in the electrodeposition device according to the first exemplary embodiment.

In FIG. 5C, a current path is shown by arrows in the case where the lower transparent electrode 12$b$ (the conductive double-sided tape 18) of the electrodeposition element 10 at the end portion on the X-axis positive direction side is connected to the positive electrode of the DC power supply and the upper transparent electrode 11$b$ (the conductive double-sided tape 17) of the electrodeposition element 10 at the end portion on the X-axis negative direction side is connected to the negative electrode of the DC power supply.

Since the three electrodeposition elements 10 are connected in series in the same direction, a current flows from the lower substrate 12 side to the upper substrate 11 side in the electrolyte layer 14 of each of the electrodeposition elements 10. Note that, in the conductive double-sided tapes 17 and 18 between the electrolyte layers 14, a current flows from the upper substrate 11 toward the lower substrate 12. Therefore, in all the three electrodeposition elements 10, silver ions contained in the electrolyte layers 14 are changed to metal silver in the vicinity of the respective upper transparent electrodes 11$b$, so that silver films (serving as a reflective surface) are formed on the respective electrodes 11$b$.

In the three electrodeposition elements 10 electrically connected to each other in the electrodeposition device according to the first exemplary embodiment, the directions of current flowing through the respective electrolyte layers 14 can coincide with one another and the sides on which the respective silver-deposition substrates are located (substrates on which the reflective surface is formed) can coincide with one another. Since the sides of the respective silver-deposition surfaces can be unified as one substrate side (any one of the upper substrate 11 and the lower substrate 12), the reflectance and the color tone (appearance) in the electrodeposition device can be made uniform. For example, in the case of constructing a display device to be displayed by tiling using the electrodeposition device according to the first exemplary embodiment, the appearance is made uniform and the display can be performed with high display quality.

Further, since the plurality of electrodeposition elements 10 are configured by tiling in the electrodeposition device according to the first exemplary embodiment, display unevenness due to a deviation in current density is reduced and the response speed is increased as compared with a single electrodeposition element having the same area (large area) when viewed in plan view, for example. Further, the thickness of the electrolyte layer 14 is 100 μm and the length in the X-axis direction is 61 mm, and as described with reference to the table of FIG. 4, leakage light at the time of voltage application is small.

In the electrodeposition device according to the first exemplary embodiment, three electrodeposition elements 10 are driven in serial drive configuration. However, the presently disclosed subject matter is not limited to this aspect. Even if wiring is provided in each of the three electrodeposition elements 10 and the three electrodeposition elements 10 are connected in parallel in the same direction and tiled, the directions of current flowing through the respective electrolyte layers 14 can coincide with each other and the sides on which the respective silver-deposition substrates are located can coincide with one another, so that the appearance such as reflectance and color tone can be made uniform.

However, many pairs of wirings corresponding to the number of the electrodeposition elements 10 are required in parallel drive configuration, whereas if the serial drive configuration is performed as in the electrodeposition device according to the first exemplary embodiment, a pair of wirings is required regardless of the number of the electrodeposition elements 10. Thus, the number of wirings can be reduced in the serial connection configuration.

Further, in the parallel drive configuration, since a space for providing wiring at a tiling boundary (boundary region between adjacent ones of the electrodeposition elements 10) is required, the tiling boundary is easily conspicuous. On the contrary, in the electrodeposition device according to the first exemplary embodiment, the tiling boundary is narrowed and hardly conspicuous.

Further, a large current flows and the influence of the wiring resistance increases when the electrodeposition elements 10 which are driven with current are driven in the parallel drive configuration. On the contrary, in the case of serial drive configuration used in the electrodeposition device according to the first exemplary embodiment and the like, the drive voltage increases according to the number of the electrodeposition elements 10, but the current value does not change, so that the influence of the wiring resistance is small and a general-purpose circuit can be easily adopted as a drive circuit. In addition, a synchronous circuit is required when all elements in the parallel drive configuration are turned on, whereas a synchronous circuit is unnecessary in the serial drive configuration, so that it is possible to simplify the drive circuit. Thus, the serial drive configuration is advantageous from the viewpoint of the simplicity of the drive circuit.

Figure 6A:
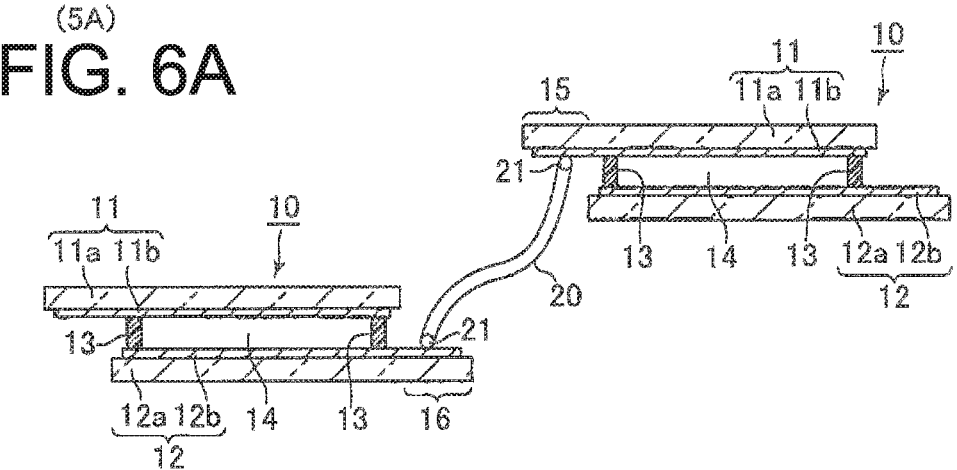
FIGS. 6A to 6C are each a schematic cross-sectional view illustrating a configuration in which the upper transparent electrode 11b of one of the adjacent electrodeposition elements 10 and the lower transparent electrode 12b of the other electrodeposition element 10 are electrically connected using a lead wire 20.

A description will now be given of another configuration with reference to FIG. 6A. As another configuration, it is conceivable that the directions of current flowing through the respective electrolyte layers 14 of the plurality of electrodeposition elements 10, after the current has been flown through the preceding electrolyte layer 14 from the lower substrate 12 side to the upper substrate 11 side of the adjacent preceding electrodeposition element 10 and then guided to the lower substrate 12 of the subject electrodeposition element 10, can coincide with one another and the sides on which the respective silver-deposition substrates are located can coincide with one another. This can be achieved by, for example, a configuration in which the upper transparent electrode 11b of one of the mutually adjacent electrodeposition elements 10 and the lower transparent electrode 12b of the other adjacent electrodeposition element 10 are electrically connected by using a lead wire 20. The lead wire 20 is bonded at one end to the protruding portion 15 of the upper transparent electrode 11b of the one electrodeposition element 10 and also at the other end to the protruding portion 16 of the lower transparent electrode 12b of the other electrodeposition element 10 by, for example, a solder 21.

Figure 6B:
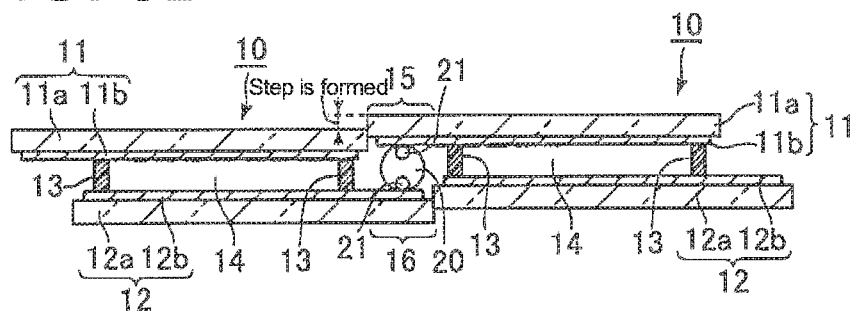
Figure 6C:
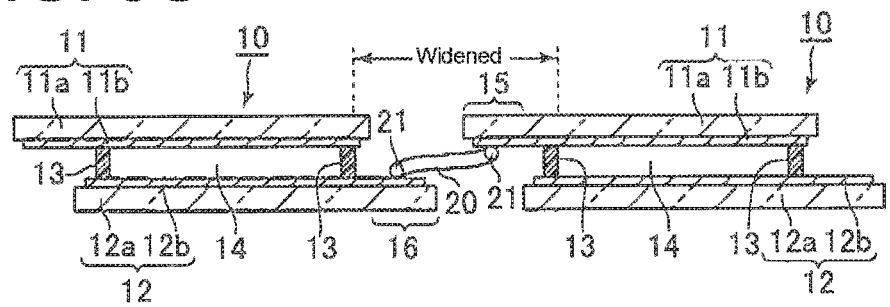

However, when the two electrodeposition elements 10 are connected so that the protruding portions 15 and 16 face to each other using the lead wire 20 as illustrated, a large step (an amount of deviation in the normal direction of the substrates 11 and 12) occurs at a joint (at a connection position of the electrodeposition elements 10) between the adjacent electrodeposition elements 10 due to the thickness of the lead wire 20 and the solder 21, for example, as shown in FIG. 6B, resulting in deterioration of the quality of the electrodeposition device. In order to eliminate the step, for example, as shown in FIG. 6C, it is considered that the protruding portions 15 and 16 do not face to each other; however, the space between the adjacent electrodeposition elements 10 becomes wider, which impairs the quality of the electrodeposition device.

In the electrodeposition device according to the first exemplary embodiment, the adjacent electrodeposition elements 10 can be connected to each other with a compressible conductive connecting material, i.e., compressible conductive double-sided tapes 17 and 18. As a result, the level difference at the joint between the adjacent electrodeposition elements 10 can be reduced, and the quality of the electrodeposition device is enhanced. The step may become, for example, less than 0.5 mm. It is also possible to configure an electrodeposition device that has no step at the joint where the adjacent electrodeposition elements 10 are bonded with a thickness equal to that of the cell gap.

As the conductive connecting material, a conductive adhesive (a flowable conductive connecting material) or the like may be used in addition to the conductive tape. Examples of the conductive adhesives used may include a conductive adhesive TK-paste (volume resistivity: 0.003 $\Omega$cm, viscosity: 15 Pa·s) manufactured by Kaiken TEC Co., Ltd., and a conductive epoxy-adhesive CW2400 (volume resistivity: less than 0.001$\Omega$·cm) manufactured by Chemtronics.

When the electrodeposition elements are tiled using a conductive connecting material having compressibility or fluidity, even if the cell gap of the electrodeposition element 10 is, for example, 100 μm or less, a large-sized and high-quality electrodeposition device having a small step at the joint and a short distance between the mutually adjacent electrodeposition elements 10 can be obtained.

It is conceivable that the electrodeposition elements 10 having the protruding portions 15 and 16 are connected and disposed so that the protruding portions 15 and 16 overlap each other when viewed in plan view. This configuration also contributes to shortening the distance between the mutually adjacent electrodeposition elements 10.

In the first exemplary embodiment, the width (length along the X-axis direction) of the protruding portions 15 and 16 is 3 mm, but it is also possible to make the width narrower. For example, the distance between the electrolyte layers 14 of the mutually adjacent electrodeposition elements 10 can be 2 mm or less.

Thus, the electrodeposition device according to the first exemplary embodiment can be configured as a high-quality electrochemical optical device.

Figure 7A:
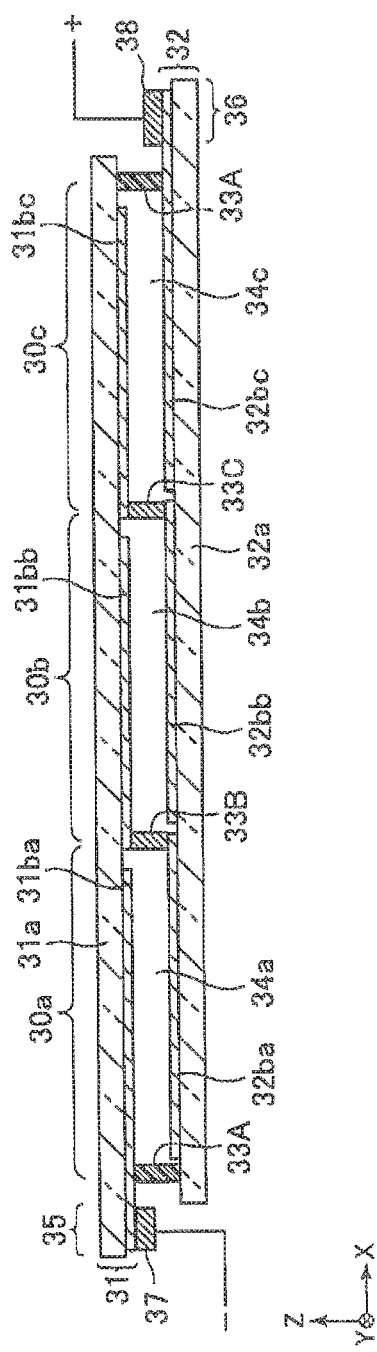
FIG. 7A is a schematic cross-sectional view illustrating an electrodeposition device according to a second exemplary embodiment.
Figure 7B:
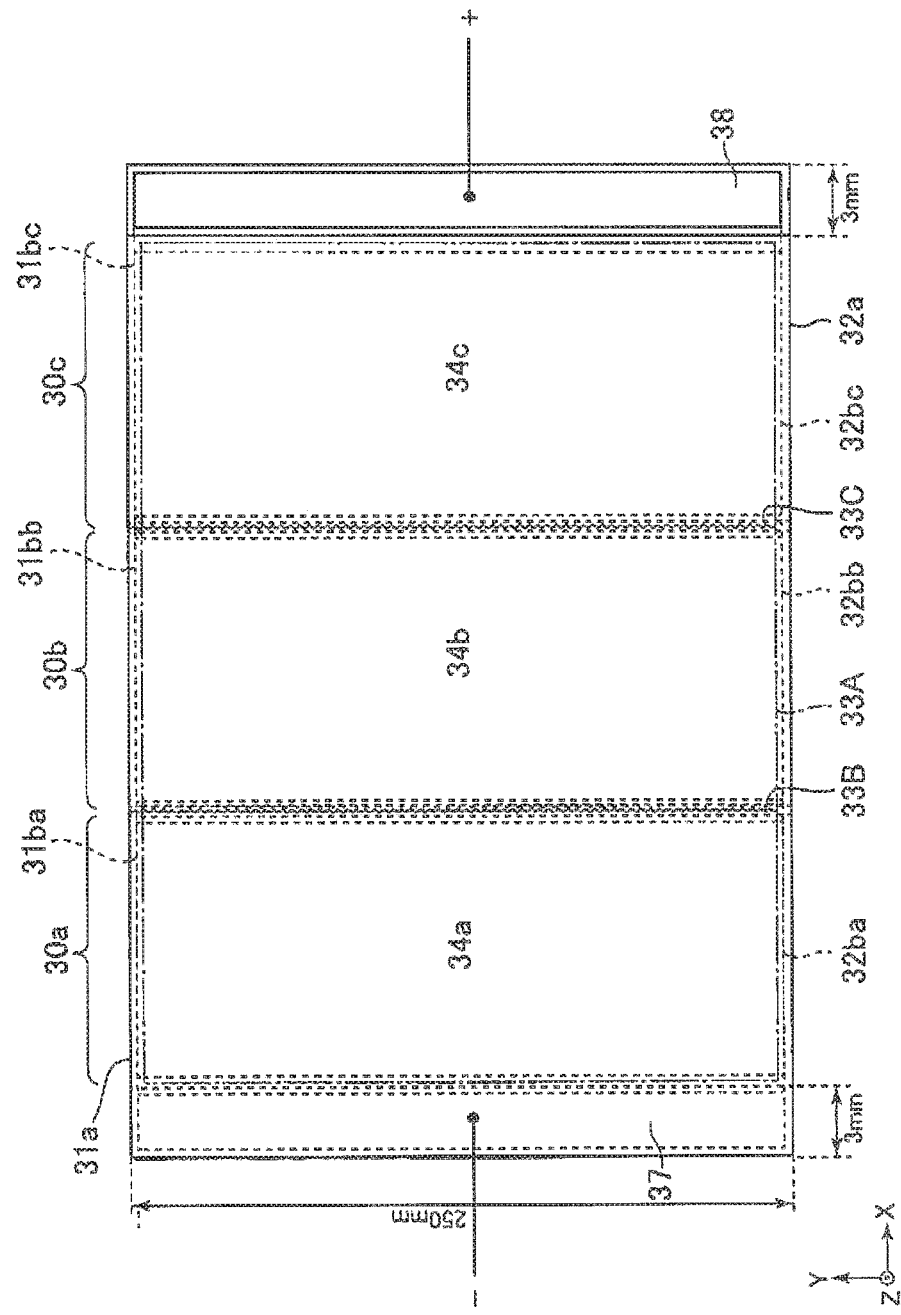
FIG. 7B is a schematic plan view illustrating the electrodeposition device according to the second exemplary embodiment.

A description will now be given of an electrodeposition device as an electrochemical optical device according to a second exemplary embodiment with reference to FIGS. 7A and 7B which are a schematic cross-sectional view and a plan view, respectively, of the electrodeposition device.

In the electrochemical optical device according to the first exemplary embodiment, the plurality of electrodeposition elements 10 are connected to each other by the conductive double-sided tapes 17 and 18. In the mutually adjacent electrodeposition elements 10, the upper transparent electrode 11b of one of the electrodeposition elements 10 and the lower transparent electrode 12b of the other electrodeposition element 10 are electrically connected to each other via conductive double-sided tapes 17 and 18 as upper and lower conduction materials, and as a result, the plurality of electrodeposition elements 10 are electrically connected in series in the same direction. In another aspect, the individual electrodeposition elements in the electrodeposition device according to the second embodiment are not connected to one another, but the electrodeposition element can intrinsically include a single upper substrate 31 and a single lower substrate 32 for a plurality of electrodeposition element regions 30a, 30b, and 30c. Furthermore, for the plurality of element regions 30a, 30b, and 30c each including an electrolyte layer, the upper transparent electrode in one of the mutually adjacent element regions and the lower transparent electrode in the other adjacent element region can be electrically connected to each other through a seal portion containing conductive particles. As a result, the plurality of (three in the illustrated exemplary embodiment) electrodeposition element regions 30a, 30b, and 30c electrically connected in series in the same direction are adjacently defined along one direction (X-axis direction). In this manner, the electrodeposition device according to the second exemplary embodiment is an electrochemical optical device in which three electrodeposition element regions 30a, 30b, and 30c are tiled.

The electrodeposition device according to the second exemplary embodiment can include the upper substrate 31 and the lower substrate 32 which are disposed to face to each other in a substantially parallel manner, and the electrolyte layers (reaction/ion conduction layers) 34a, 34b, and 34c, which are disposed between the substrates 31 and 32.

The upper substrate 31 can include an upper transparent substrate 31a and upper transparent electrodes 31ba, 31bb, and 31bc formed on the upper transparent substrate 31a. The upper transparent electrodes 31ba, 31bb, and 31bc are electrodes that are electrically separated from each other and have a smooth surface. Similarly, the lower substrate 32 can include a lower transparent substrate 32a and lower transparent electrodes 32ba, 32bb, and 32bc formed on the lower transparent substrate 32a. The lower transparent electrodes 32ba, 32bb, and 32bc are electrodes that are electrically separated from each other and have a smooth surface. The upper transparent electrodes 31ba, 31bb, and 31bc and the lower transparent electrodes 32ba, 32bb, and 32bc each have a rectangular planar shape in which two adjacent sides extend in the X-axis direction and the Y-axis direction, respectively. The upper transparent substrate 31a and the lower transparent substrate 32a are each, for example, a glass substrate having a thickness of 0.7 mm. The upper transparent electrodes 31ba, 31bb, and 31bc and the lower transparent electrodes 32ba, 32bb, and 32bc are each formed of, for example, ITO having a thickness of 300nm.

Between the upper substrate 31 and the lower substrate 22, seal portions 33a, 33b, and 33c can be provided to define and seal certain inner regions thereinside. The electrolyte layer 34a can be arranged in the inner region defined by the seal portions 33A and 33B between the upper substrate 31 and the lower substrate 32, i.e., the upper transparent electrode 31ba and the lower transparent electrode 32ba. The electrolyte layer 34b can be arranged in the inner region defined by the seal portions 33A, 33B, and 33C between the upper substrate 31 and the lower substrate 32, i.e., the upper transparent electrode 31bb and the lower transparent electrode 32bb. The electrolyte layer 34c can be arranged in the inner region defined by the seal portions 33A and 33C between the upper substrate 31 and the lower substrate 32, i.e., the upper transparent electrode 31bc and the lower transparent electrode 32bc. As a result, the electrolyte layers 34a, 34b, and 34c can be sealed by the sealing portions 33A, 33B, and 33C, and disposed adjacent to each other along one direction (X-axis direction). The electrolyte layers 34a, 34b, and 34c can contain an electrodeposition material (e.g., AgBr) that contains silver (silver ions) and may have a thickness of 1 µm to 500 µm, and of 100 µm in this example. The seal portion 33A can be formed from a material such as a resin, and constitute an outer frame portion of the seal portion. The seal portions 33B and 33C may be configured to contain conductive particles. Thus, the conductive particle-containing seal portions 33B and 33C can be formed using, for example, a resin containing conductive particles, and disposed at the boundary between the electrolyte layers 34a and 34b and the boundary between the electrolyte layers 34b and 34c, respectively.

The seal portion 33A can be formed using, for example, a seal material (an acrylic-based resin material) TB3035B (viscosity: 51 Pa·s) manufactured by Threebond Holdings, Co., Ltd. The conductive particle-containing sealing portions 33B and 33C can be formed by mixing 10 wt % of Ag-film-coated glass beads (powder electric resistivity: 0.004 Ω·cm) manufactured by Unitika Ltd. with the sealing material TB3035B.

In this manner, the electrodeposition element regions 30a. 30b, and 30c each correspondingly including the upper transparent substrate 31a, the lower transparent substrate 32a, the upper transparent electrodes 31ba, 31bb, 31bc, the lower transparent electrode 32ba, 32bb, 32bc, and the electrolyte layer 34a, 34b, 34c are defined at positions corresponding to the arrangement positions of the respective electrolyte layers 34a, 34b, and 34c.

The conductive particle-containing seal portion 33B can electrically connect the lower transparent electrode 32ba of the electrodeposition element region 30a and the upper transparent electrode 31bb of the adjacent electrodeposition element region 30b. The conductive particle-containing seal portion 33C can electrically connect the lower transparent electrode 32bb of the electrodeposition element region 30b and the upper transparent electrode 31bc of the adjacent electrodeposition element region 30c. Thus, the electrodeposition element regions 30a. 30b, and 30c can be electrically connected in series in the same direction.

In the electrodeposition device according to the second exemplary embodiment, the substrates 31 and 32 are provided with protruding portions 35 and 36 at end portions on the X-axis negative direction side and on the X-axis positive direction side, respectively. The protruding portions 35 and 36 can protrude in mutually opposite directions (in the X-axis negative direction and in the X-axis positive direction, respectively) from the region where the substrates 31 and 32 overlap when viewed in plan view, respectively. The electrodes 31ba and 32bc are also arranged on the protruding portions 35 and 36, respectively.

The electrodeposition element 10 may have a rectangular shape with a length, for example, in the Y-axis direction of 250 mm when viewed in plan view, and the region where the substrates 31 and 32 overlap each other when viewed in plan view may also have a rectangular shape with a length in the Y-axis direction of 250 mm, for example. The protruding portions 35 and 36 may each have a rectangular shape having, for example, a length of 3 mm in the X-axis direction and a length of 250 mm in the Y-axis direction. The electrolyte layers 34a, 34b, and 34c may each have a rectangular shape with a length of about 61 mm in the X-axis direction and a length of about 250 mm in the Y-axis direction.

In the electrodeposition device according to the second exemplary embodiment, the conductive double-sided tapes 37 and 38 similar to those of the first exemplary embodiment can be disposed on the electrodes 31ba and 32bc of the protruding portions 35 and 36. The conductive double-sided tapes 37 and 38 may be arranged so as to extend over the length of the arrangement range of the electrolyte layer (34a, 34b, and 34c) in the Y-axis direction, i.e., in a range greater than or equal to the arrangement range of the electrolyte layer (34a, 34b, and 34c) in the Y-axis direction.

In the electrodeposition device according to the second exemplary embodiment, three electrodeposition element regions 30a. 30b, and 30c are used. However, a larger number of electrodeposition element regions can be connected in series in the same direction to form a larger electrodeposition device.

The electrodeposition device according to the second exemplary embodiment is configured such that, for example, a DC power source is electrically connected between the lower transparent electrode 32bc (the conductive double-sided tape 38) of the electrodeposition element region 30c and the upper transparent electrode 31ba (the conductive double-sided tape 37) of the electrodeposition element region 30a. and a driving voltage is applied therebetween to drive the electrodeposition device.

In FIG. 7C, a current path is shown by arrows in the case where the lower transparent electrode 32bc of the electrodeposition element region 30c is connected to the positive electrode of the DC power supply and the upper transparent electrode 31ba of the electrodeposition element region 30a is connected to the negative electrode of the DC power supply.

Since the three electrodeposition element regions 30a, 30b, and 30c are connected in series in the same direction, a current flows from the lower substrate 32 side to the upper substrate 31 side in each of the electrolyte layers 34a, 34b, and 34c of the respective element regions 30a, 30b, and 30c. Note that, in the conductive particle-containing seal portions 33B and 33C between the electrolyte layers 34a, 34b, and 34c, a current flows from the upper substrate 31 side toward the lower substrate 32 side. Therefore, in all the three electrodeposition element regions 30a, 30b, and 30c, silver ions contained in the electrolyte layers 34a, 34b, and 34c are changed to metal silver in the vicinity of the respective upper transparent electrodes 31ba, 31bb, and 31bc, and silver films (serving as a reflective surface) are formed on the respective electrodes 31ba, 31bb, and 31bc (meaning that the silver films are formed on the same side).

The electrodeposition device according to the second exemplary embodiment can provide the same advantageous effects as those of the electrodeposition device according to the first exemplary embodiment. Furthermore, the distance between the mutually adjacent electrolyte layers 34a, 34b, 34c of the electrodeposition element regions 30a, 30b, 30c can be made shorter than that in the first exemplary embodiment. In the electrodeposition device according to the second embodiment, since the upper substrate 31 and the lower substrate 32 are each a single piece, a joint step does not occur between the mutually adjacent electrodeposition element regions 30a, 30b, and 30c.

Figure 7D:
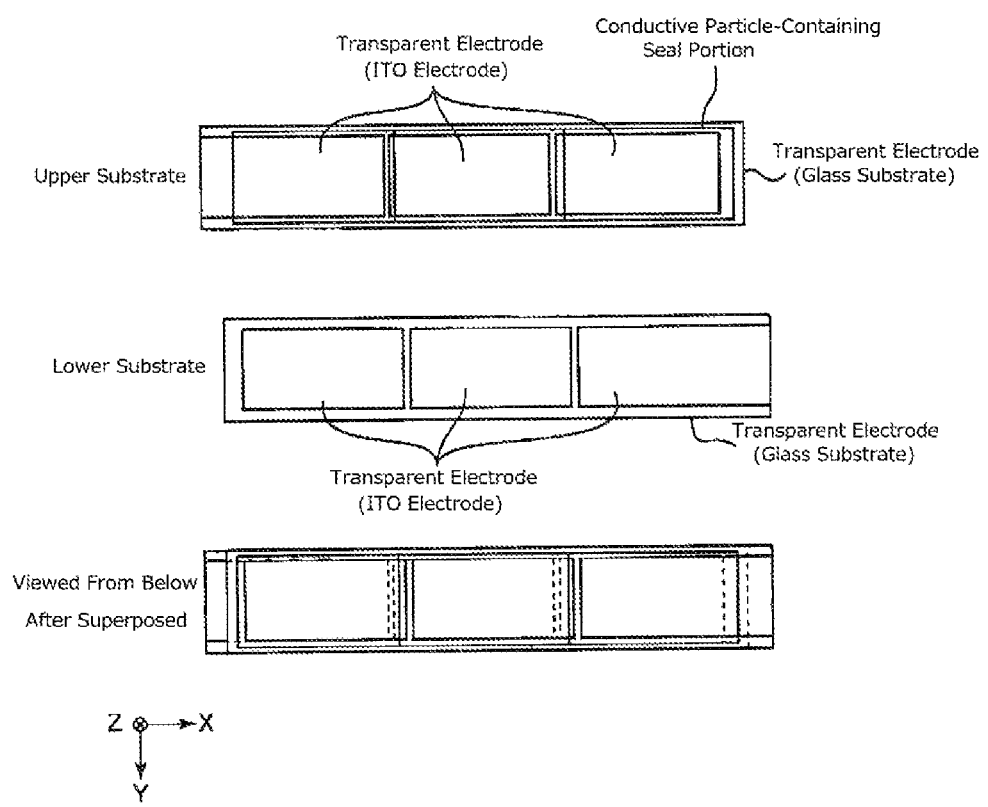
FIG. 7D is a schematic plan view illustrating a modified example of the electrodeposition device according to the second exemplary embodiment.

FIG. 7D illustrates a modified example of the electrodeposition device according to the second exemplary embodiment. In the second exemplary embodiment, the seal portions 33B and 33C containing the conductive particles and the seal portion 33A not containing conductive particles are used. However, only the seal portion containing the conductive particles may be used. For example, as shown in the modified example of FIG. 7D, the conductive particle-containing seal portion is arranged at respective ends in the Y-axis direction on the upper transparent substrate (glass substrate) and the lower transparent substrate (glass substrate) instead of arranging on the transparent electrode (ITO electrode).

The electrodeposition devices according to the second exemplary embodiment can be a high-quality electrochemical optical device.

The electrodeposition devices according to the first and second exemplary embodiments are configured by arranging a plurality of (three in the illustrated examples) electrodeposition element regions 10, 30a, 30b, and 30c in one direction (X-axis direction). The increase in size of the electrodeposition device can be realized, for example, by arranging a larger number of electrodeposition element regions in the X-axis direction, and/or by increasing the size of each electrodeposition element region (the size of the electrolyte layer) in the Y-axis direction. Even when the size of each electrodeposition element region is increased in the Y-axis direction, a high-quality electrodeposition device can be obtained by arranging the conductive double-sided tape (a conductor having substantially the same potential at the arrangement position) in a range covering the arrangement range of the electrolyte layer in the Y-axis direction (a direction orthogonal to the arrangement direction of the electrodeposition element regions).

Incidentally, the size of the electrolyte layers 14, 34a, 34b, and 34c in the X-axis direction of the respective electrodeposition element regions 10, 30a, 30b, and 30c may be increased to realize an increase in size in the X-axis direction. In this case, the size of the electrolyte layers 14, 34a, 34b, and 34c in the X-axis direction may be set within the range described with reference to the table of FIG. 4 depending on the thickness of the electrolyte layers 14, 34a, 34b, and 34c.

As discussed above, although the presently disclosed subject matter has been described together with the exemplary embodiments, it is not limitative.

For example, although the electrochemical optical device is configured using the electrodeposition element region in the exemplary embodiments described above, an electrochromic element region, for example, an electrochromic element can be widely used to configure the electrochemical optical device. Generally, the electrochemical optical device can be configured using electrochemical optical element regions, such as electrochemical optical elements.

Further, in the exemplary embodiments, the description has been given that the conductive double-sided tapes 17 and 18 are arranged on the electrodes 11b and 12b on the protruding portions 15 and 16 of the electrodeposition element 10, and the electrodeposition elements 10 are connected to each other so that the conductive double-sided tape 17 of one electrodeposition element 10 and the conductive double-sided tape 18 of the other electrodeposition element 10 are bonded to each other. However, a conductive double-sided tape having a thickness of, for example, about twice the thickness of the conductive double-sided tape 17 may be used and arranged only, for example, on the protruding portion 15 of the one electrodeposition element 10. In this case, the electrodeposition elements 10 are connected to each other such that the conductive double-sided tape disposed on the protruding portion 15 of the one electrodeposition element 10 and the lower transparent electrode 12b of the protruding portion 16 of the other electrodeposition element 10 are bonded to each other.

The electrodeposition devices according to the exemplary embodiments can be used, for example, in a mirror display such as a television or a digital photo frame which becomes a mirror when not in use. They can also be used for variable mirror shades in windows of moving bodies, such as automobiles.

Further, when an electrodeposition device is configured using an electrodeposition element region capable of electrically switching between a transparent state and a white state by a DC voltage applied between upper and lower electrodes, the electrodeposition device can be used for, for example, a variable large screen (a window usually in a transparent state is used as a projector screen at the time of a conference) or a privacy screen (a window is switched between a transparent state and a white state which is not visible from the outside depending on mood).

As described above, the presently disclosed subject matter provides the high-quality electrochemical optical device including: first and second substrates having electrodes so that the electrodes of the second substrates are arranged to correspondingly face the electrodes of the first substrate; reaction/ion conduction layers each disposed between one electrode of the first substrate and a corresponding one electrode of the second substrate; and conduction materials disposed between the first and second substrates and between the reaction/ion conduction layers. Electrochemical optical element regions are defined in a tiling fashion at respective positions of the reaction/ion conduction layers to correspondingly include the electrodes of the first and second substrates, and the reaction/ion conduction layer. The conduction materials electrically connect the electrochemical optical element regions in series in the same direction by connecting the electrode of the first substrate in one of the mutually adjacent electrochemical optical element regions and the electrode of the second substrate in the other electrochemical optical element region.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. An electrochemical optical device comprising:
   a first substrate having a surface and a plurality of first electrodes electrically separated from one another, the plurality of first electrodes being disposed on the surface;
   a second substrate having an opposite surface to the surface of the first substrate and a plurality of second electrodes electrically separated from one another, the plurality of second electrodes being disposed on the opposite surface of the second substrate, the second substrate being arranged to face to the first substrate in a substantially parallel manner, so that each of the plurality of second electrodes is arranged to face to each of the plurality of first electrodes disposed on the surface of the first substrate;
   a plurality of reaction/ion conduction layers each disposed between one of the plurality of first electrodes of the first substrate and a corresponding one of the plurality of second electrodes of the second substrate arranged to face to the one of the plurality of first electrodes of the first substrate; and
   a plurality of conduction materials disposed between the surface of the first substrate and the opposite surface of the second substrate and disposed between the plurality of reaction/ion conduction layers, the plurality of conduction materials being configured to electrically connect in series a plurality of electrochemical optical element regions in a certain same direction, the plurality of electrochemical optical element regions corresponding to respective positions of the plurality of reaction/ion conduction layers and defined to include the first electrode of the first substrate, the second electrode of the second substrate, and the reaction/ion conduction layer, the conduction material electrically connecting the first electrode of the first substrate in one of the electrochemical optical element regions and the second electrode of the second substrate in the electrochemical optical element region adjacent to the one electrochemical optical element region, wherein the plurality of electrochemical optical element regions fill in a tiling fashion.

2. The electrochemical optical device according to claim 1, wherein
   the plurality of electrochemical optical element regions are arranged in one direction,
   each of the reaction/ion conduction layers of the plurality of electrochemical optical element regions has a thickness of 1 μm or more and 500 μm or less, and
   each of the reaction/ion conduction layers of the plurality of electrochemical optical element regions has a length in the one direction of 10 mm or less when the thickness of the reaction/ion conduction layer is 1 μm or more and less than 30 μm, of 20 mm or less when the thickness of the reaction/ion conduction layer is 30 μm or more and less than 50 μm, of 30 mm or less when the thickness of the reaction/ion conduction layer is 50 μm or more and less than 70 μm, of 56.6 mm or less when the thickness of the reaction/ion conduction layer is 70 μm or more and less than 100 μm, or of 63 mm or less when the thickness of the reaction/ion conduction layer is 100 μm or more and 500 μm or less.

3. The electrochemical optical device according to claim 1, wherein
   the plurality of electrochemical optical element regions are arranged in one direction, and
   a conductor having substantially the same potential at an arrangement position in a range covering an arrangement range of the reaction/ion conduction layer in a direction orthogonal to the one direction in which the plurality of electrochemical optical element regions are arranged.

4. The electrochemical optical device according to claim 2, wherein
   the plurality of electrochemical optical element regions are arranged in one direction, and
   a conductor having substantially the same potential at an arrangement position in a range covering an arrangement range of the reaction/ion conduction layer in a direction orthogonal to the one direction in which the plurality of electrochemical optical element regions are arranged.

5. The electrochemical optical device according to claim 1, wherein
   the plurality of electrochemical optical element regions are arranged in one direction and are each composed of a single electrochemical optical element,
   in the single electrochemical optical element, the first and second substrates include respective protruding portions that protrude in mutually opposite directions along the one direction from respective regions where the first and second substrates overlap each other in plan view, and
   mutually adjacent ones of the electrochemical optical elements are connected to each other so that the protruding portions face to each other.

6. The electrochemical optical device according to claim 2, wherein
   the plurality of electrochemical optical element regions are arranged in one direction and are each composed of a single electrochemical optical element,
   in the single electrochemical optical element, the first and second substrates include respective protruding portions that protrude in mutually opposite directions along the one direction from respective regions where the first and second substrates overlap each other in plan view, and
   mutually adjacent ones of the electrochemical optical elements are connected to each other so that the protruding portions face to each other.

7. The electrochemical optical device according to claim 3, wherein
   the plurality of electrochemical optical element regions are arranged in one direction and are each composed of a single electrochemical optical element, in the single electrochemical optical element, the first and second substrates include respective protruding portions that protrude in mutually opposite directions along the one direction from respective regions where the first and second substrates overlap each other in plan view, and mutually adjacent ones of the electrochemical optical elements are connected to each other so that the protruding portions face to each other.

8. The electrochemical optical device according to claim 4, wherein the plurality of electrochemical optical element regions are arranged in one direction and are each composed of a single electrochemical optical element, in the single electrochemical optical element, the first and second substrates include respective protruding portions that protrude in mutually opposite directions along the one direction from respective regions where the first and second substrates overlap each other in plan view, and mutually adjacent ones of the electrochemical optical elements are connected to each other so that the protruding portions face to each other.

9. The electrochemical optical device according to claim 5, wherein the conduction material is a conductive connecting material having any of a compression property and a flowable property.

10. The electrochemical optical device according to claim 6, wherein the conduction material is a conductive connecting material having any of a compression property and a flowable property.

11. The electrochemical optical device according to claim 7, wherein the conduction material is a conductive connecting material having any of a compression property and a flowable property.

12. The electrochemical optical device according to claim 8, wherein the conduction material is a conductive connecting material having any of a compression property and a flowable property.

13. The electrochemical optical device according to claim 9, wherein the conductive connecting material is any of a conductive tape and a conductive adhesive.

14. The electrochemical optical device according to claim 10, wherein the conductive connecting material is any of a conductive tape and a conductive adhesive.

15. The electrochemical optical device according to claim 11, wherein the conductive connecting material is any of a conductive tape and a conductive adhesive.

16. The electrochemical optical device according to claim 12, wherein the conductive connecting material is any of a conductive tape and a conductive adhesive.

17. The electrochemical optical device according to claim 1, wherein the conduction material is a part of a seal material configured to seal the reaction/ion conduction layer.

18. The electrochemical optical device according to claim 2, wherein the conduction material is a part of a seal material configured to seal the reaction/ion conduction layer.

19. The electrochemical optical device according to claim 3, wherein the conduction material is a part of a seal material configured to seal the reaction/ion conduction layer.

20. The electrochemical optical device according to claim 4, wherein the conduction material is a part of a seal material configured to seal the reaction/ion conduction layer.

* * * * *